(12) United States Patent
Nanahara et al.

(10) Patent No.: US 11,105,387 B2
(45) Date of Patent: Aug. 31, 2021

(54) ELECTRIC BRAKE ACTUATOR

(71) Applicant: TOYOTA JIDOSHA KABUSHIKI KAISHA, Toyota (JP)

(72) Inventors: Masaki Nanahara, Toyota (JP); Takayuki Wazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 16/741,943

(22) Filed: Jan. 14, 2020

(65) Prior Publication Data
US 2020/0240485 A1      Jul. 30, 2020

(30) Foreign Application Priority Data

Jan. 28, 2019 (JP) .............................. JP2019-012279

(51) Int. Cl.

| | |
|---|---|
| F16D 55/22 | (2006.01) |
| F16D 65/18 | (2006.01) |
| F16D 55/226 | (2006.01) |
| F16D 127/02 | (2012.01) |
| F16D 121/24 | (2012.01) |
| F16D 125/40 | (2012.01) |

(Continued)

(52) U.S. Cl.
CPC ......... *F16D 65/183* (2013.01); *F16D 55/226* (2013.01); *B60T 1/065* (2013.01); *F16D 2055/0029* (2013.01); *F16D 2121/24* (2013.01); *F16D 2125/40* (2013.01); *F16D 2127/02* (2013.01)

(58) Field of Classification Search
CPC ...... F16D 65/18; F16D 65/183; F16D 55/226; F16D 2055/0029; F16D 2121/24; F16D 2125/40; F16D 2127/02; B60T 13/746
See application file for complete search history.

(56) References Cited

U.S. PATENT DOCUMENTS

| | | | |
|---|---|---|---|
| 4,392,558 A * | 7/1983 | Heibel | F16D 65/22 188/325 |
| 2004/0104088 A1* | 6/2004 | Usui | F16D 65/567 188/156 |

(Continued)

FOREIGN PATENT DOCUMENTS

| | | |
|---|---|---|
| JP | 2013-024389 A | 2/2013 |
| JP | 2019-163831 A | 9/2019 |
| WO | WO-2011142253 A1 * 11/2011 | ......... F16H 25/2454 |

*Primary Examiner* — Nicholas J Lane
(74) *Attorney, Agent, or Firm* — Sughrue Mion, PLLC

(57) ABSTRACT

An electric brake actuator including a retracting torque applying mechanism that applies a retracting torque to a rotational shaft and including: a torsion spring; a stator including a first retaining portion retaining one end portion of the torsion spring; a rotor including a second retaining portion retaining the other end portion of the torsion spring and configured to be rotated relative to the stator so as to twist the torsion spring; and a clutch mechanism configured to selectively establish a clutch ON state and a clutch OFF state, wherein a first retaining portion prohibits the one end portion from being displaced in a forward rotational direction and includes a biasing member that biases the one end portion in the forward rotational direction, the first retaining portion being configured to allow the one end portion to be displaced in a reverse rotational direction against a biasing force of the biasing member.

4 Claims, 8 Drawing Sheets

(51) Int. Cl.
    *B60T 1/06*     (2006.01)
    *F16D 55/00*    (2006.01)

(56) References Cited

U.S. PATENT DOCUMENTS

| | | | |
|---|---|---|---|
| 2019/0293134 A1* | 9/2019 | Nanahara | F16F 1/065 |
| 2019/0351884 A1* | 11/2019 | Tajima | F16D 65/18 |
| 2020/0156612 A1* | 5/2020 | Ikuma | F16H 1/32 |
| 2020/0158210 A1* | 5/2020 | Nishigaya | F16H 1/34 |
| 2020/0263768 A1* | 8/2020 | Nanahara | F16D 55/226 |
| 2020/0278000 A1* | 9/2020 | Hagiwara | B60T 13/74 |

* cited by examiner

ELECTRIC BRAKE ACTUATOR

CROSS REFERENCE TO RELATED APPLICATION

The present application claims priority to Japanese Patent Application No. 2019-012279, which was filed on Jan. 28, 2019, the disclosure of which is herein incorporated by reference in its entirety.

BACKGROUND

Technical Field

The following disclosure relates to an electric brake actuator configured to give a braking force to a wheel by a force of an electric motor.

Description of Related Art

There has been developed an electric brake actuator (hereinafter simply referred to as "actuator" where appropriate) configured to give a braking force to a wheel by pushing a friction member such as a brake pad onto a rotary body such as a disc rotor that rotates with the wheel. The actuator typically includes a piston, an electric motor, and a motion converting mechanism that includes a rotational shaft rotated by the electric motor and that is configured to convert a rotational motion of the electric motor into an advancing and retracting movement of the piston. In the case where the electric motor fails to generate a force in a state in which the piston has advanced and the braking force is being generated, the piston cannot be retracted and therefore the braking force cannot be cancelled. In view of this, the actuator is equipped with a retracting torque applying mechanism configured to apply, to the rotational shaft, a retracting torque that is a torque in a direction to retract the piston in dependence on an elastic force of a torsion spring, as described in Patent Document 1 (Japanese Patent Application Publication No. 2013-024389).

SUMMARY

An actuator described in the Patent Document 1 includes two electromagnetic solenoids, and an electromagnetic clutch is constructed by one of the two electromagnetic solenoids, as illustrated in FIGS. 12 and 13. Thus, the actuator illustrated in FIGS. 12 and 13 of the Patent Document 1 is complicated in structure. Further, it is needed in the actuator to keep supplying an electric current to the electromagnetic solenoids in a normal condition for ensuring that the retracting torque is applied in the event of an electric failure. In the meantime, an actuator illustrated in other drawings of the Patent Document 1, namely, an actuator not equipped with the clutch mechanism is considered. Such an actuator is preferably configured such that a suitable clearance is always present between the friction member and the rotary body in a time period in which the braking force is not being generated for ensuring a good response with respect to generation of the braking force while avoiding what is called drag phenomenon. The drag phenomenon is a phenomenon in which the friction member and the rotary body rotate relative to each other while being in contact with each other in a situation in which no request for the braking force is being made. As the wear of the friction member progresses, the standby position of the piston needs to be moved forward to provide the suitable clearance between the friction member and the rotary body. Thus, in the actuator illustrated in other drawings of the Patent Document 1, it is required that a certain amount of electric current be kept supplied, even in the standby state, to the electric motor against the retracting torque applied by the retracting torque applying mechanism. The problems described above are merely one example. There remains much room for improvement in the electric brake actuator equipped with the retracting torque applying mechanism, and some modifications can enhance the utility of the actuator. Accordingly, one aspect of the present disclosure is directed to an electric brake actuator having high utility.

In one aspect of the present disclosure, an electric brake actuator configured to push a friction member onto a rotary body that rotates with a wheel includes:

a main body;

a piston held by the main body so as to be advanceable and retractable, the piston being configured to push the friction member toward the rotary body by advancing;

an electric motor;

a motion converting mechanism including a rotational shaft that receives a reaction force of a force by which the piston causes the friction member to be pushed onto the rotary body and that is rotated by the electric motor, the motion converting mechanism being configured to convert a rotational motion of the electric motor into an advancing and retracting movement of the piston; and a retracting torque applying mechanism including a torsion spring and configured to apply, to the rotational shaft, a retracting torque that is a torque in a direction in which the piston retracts, in dependence on an elastic torque generated by the torsion spring, wherein the retracting torque applying mechanism includes:

a stator fixedly provided on the main body and including a first retaining portion retaining one end portion of the torsion spring;

a rotor including a second retaining portion retaining the other end portion of the torsion spring, the rotor being configured to be rotated relative to the stator so as to twist the torsion spring; and a clutch mechanism configured such that, in a state in which the rotational shaft receives the reaction force, the rotational shaft and the rotor are in contact with each other by the reaction force so as to rotate together as a unit and such that, in a state in which the rotational shaft does not receive the reaction force, the rotational shaft and the rotor are spaced apart from each other for allowing relative rotation of the rotational shaft and the rotor, wherein a rotational direction that is the same as a rotational direction of the rotational shaft when the piston advances is defined as a forward rotational direction in the actuator, and a rotational direction that is the same as a rotational direction of the rotational shaft when the piston retracts is defined as a reverse rotational direction in the actuator, and wherein the first retaining portion prohibits the one end portion of the torsion spring from being displaced in the forward rotational direction and includes a biasing member that biases the one end portion of the torsion spring in the forward rotational direction, the first retaining portion being configured to allow the one end portion of the torsion spring to be displaced in the reverse rotational direction against a biasing force of the biasing member.

The electric brake actuator according to the present disclosure includes the retracting torque applying mechanism.

Owing to the retracting torque applying mechanism, even if the electric motor fails to operate due to an electric failure or the like in a state in which the braking force is being generated, the piston can be retracted to such an extent that the braking force is no more generated. Further, the retracting torque applying mechanism of the electric brake actuator according to the present disclosure is equipped with the clutch mechanism operable by the reaction force of the force by which the friction member is pushed onto the rotary body, in other words, the retracting torque applying mechanism is equipped with a mechanical clutch mechanism. Thus, the retracting torque applying mechanism is simple in structure and can apply, to the rotational shaft, the retracting torque that is a torque in a direction in which the piston retracts only in a time period during which the braking force is being generated, without using any electromagnetic solenoid, that is, without relying on electric power. In other words, the clutch mechanism selectively establishes: a state in which the rotational shaft and the rotor are rotated together as a unit when the braking force is being generated (hereinafter referred to as "clutch ON state" where appropriate); and a state in which the rotational shaft and the rotor are allowed to rotate relative to each other when the braking force is not being generated (hereinafter referred to as "clutch OFF state" where appropriate). Thus, when the braking force is not being generated, it is not required in the electric brake actuator of the present disclosure to supply an electric current to the electric motor against the retracting torque to appropriately keep the clearance between the friction member and the rotary body.

In the meantime, a situation is expected to occur in which the braking force is unintentionally generated while the clutch ON state is established in a state in which the braking force should not be generated, due to external factors such as thermal expansion of the friction member and constituent elements of the electric brake actuator, inclination of the rotary body, and the like. (This situation will be hereinafter referred to as "external-factor-dependent braking force generating situation" where appropriate.) Further, there exists, in the actuator, a hysteresis in a relationship between the braking force and the rotation amount of the rotational shaft that arises from friction of the motion converting mechanism, in other words, there exists a difference between the rotation amount (rotational position) of the rotational shaft in the increasing process of the braking force and the rotation amount (rotational position) of the rotational shaft in the decreasing process of the braking force when the same magnitude of the braking force is being generated. Due to the hysteresis, the clutch ON state continues at a time point when the clutch OFF state should be established in the decreasing process of the braking force, and a situation in which the braking force remains is expected to occur. (This situation will be hereinafter referred to as "braking force remaining situation" where appropriate.) In the case where those situations occur, it is desirable to retract the piston by activating the electric motor in the clutch ON state, so as to establish the clutch OFF state. The electric brake actuator of the present disclosure allows the one end portion of the torsion spring to be displaced in the reverse rotational direction against the biasing force in the forward rotational direction. Accordingly, the piston can be retracted in the clutch ON state utilizing the allowed displacement. In this respect, when the piston is retracted and the clutch OFF state is then established, the retracting torque applying mechanism returns, by the basing force in the forward rotational direction, to its state in which the retracting torque applying mechanism should be placed when the braking force is not being generated. In other words, the retracting torque applying mechanism returns to the standby state.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

VARIOUS FORMS OF ELECTRIC BRAKE ACTUATOR ACCORDING TO PRESENT DISCLOSURE

Figure 1:
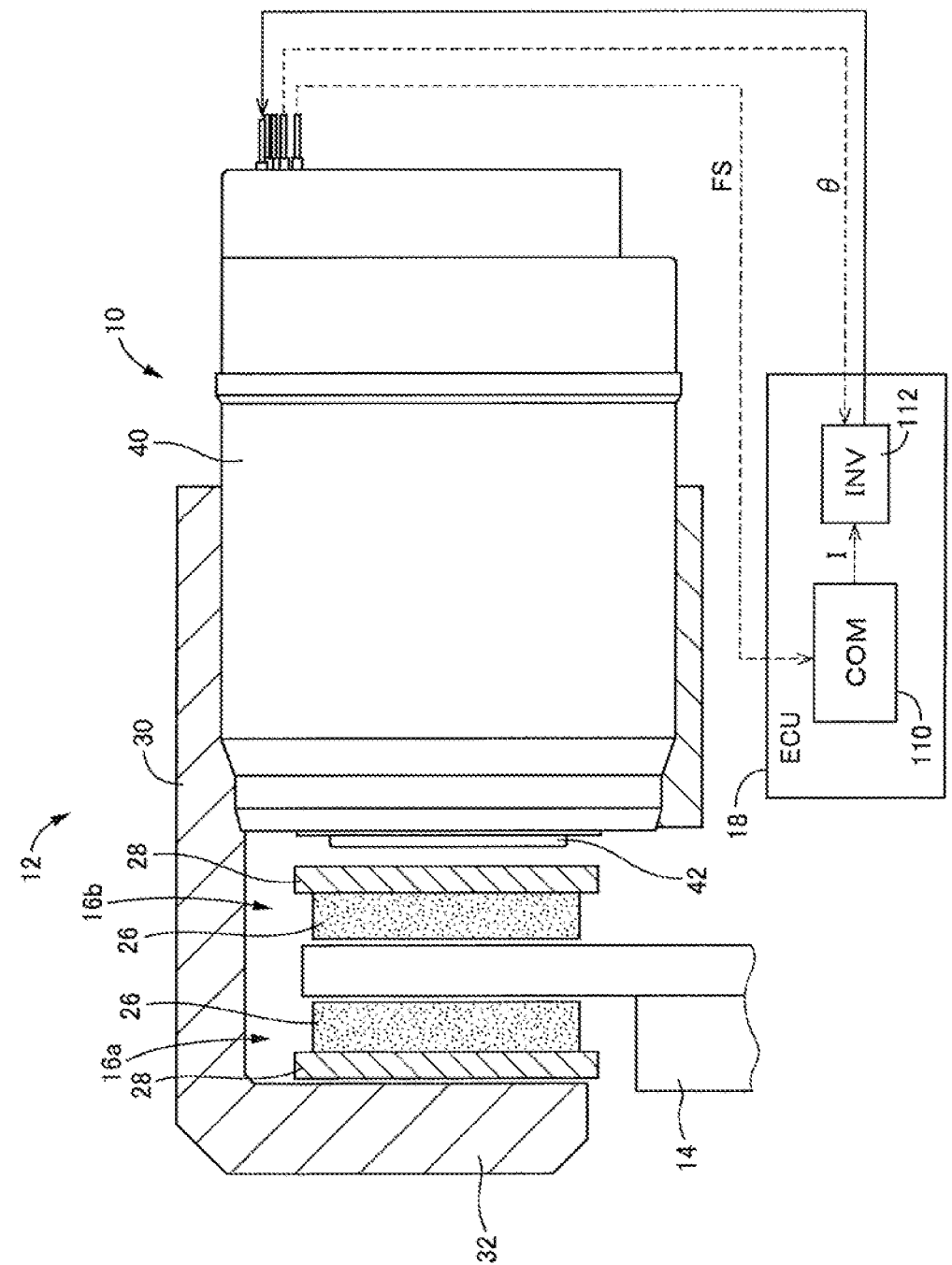
FIG. 1 is a view of an electric brake device that employs an electric brake actuator according to one embodiment.

The electric brake actuator according to the present disclosure is preferably configured such that the first retaining portion allows the one end portion of the torsion spring to be displaced in the reverse rotational direction against the biasing force in the forward rotational direction, by not less than 10° in the rotational direction. In the case where the motion converting mechanism having an ordinarily set conversion ratio is employed, this angular range enables the external-factor-dependent braking force generating situation to be adequately dealt with. In view of structural simplicity, a spring such as a compression coil spring may be employed as the biasing member for applying the biasing force.

The electric brake actuator according to the present disclosure is preferably configured such that the retracting torque applying mechanism includes a lower limit torque ensuring mechanism configured to prohibit the elastic torque of the torsion spring from becoming less than a set lower limit torque even in the state in which the rotational shaft does not receive the reaction force of the force by which the piston pushes the friction member onto the rotary body, namely, even in the clutch OFF state. In other words, it is preferable that the retracting torque in accordance with the set lower limit torque be applied to the rotational shaft as what is called set torque at a start time point of generation of the braking force. The lower limit torque ensuring mechanism may be configured such that the one end portion of the torsion spring prohibits rotation of the rotor in the reverse rotational direction in a state in which the torsion spring is generating the set lower limit torque. The thus configured lower limit torque ensuring mechanism is simple in structure.

DETAILED DESCRIPTION OF THE EMBODIMENT

Referring to the drawings, there will be explained in detail an electric brake actuator according to one embodiment of the present disclosure. It is to be understood that the present disclosure is not limited to the details of the following embodiment but may be embodied based on the forms described in Various Forms and may be changed and modified based on the knowledge of those skilled in the art.

A. Electric Brake Device Including Brake Actuator

As shown in FIG. 1, an electric brake actuator 10 (hereinafter simply referred to as "actuator 10" where appropriate) according to the present embodiment is employed as a major constituent element in an electric brake device. The electric brake device includes: a brake caliper 12 (hereinafter simply referred to as "caliper 12" where appropriate) that holds the actuator 10; a disc rotor 14, as a rotary body, configured to rotate with a wheel; a pair of brake pads 16a, 16b (hereinafter simply referred to as "pads 16a, 16b", "pad 16a" or "pad 16b" where appropriate); and an electronic control unit (ECU) 18, as a controller, which will be explained in detail.

The caliper 12 is held by a mount (not shown) provided on a carrier (not shown) that rotatably holds the wheel, such that the caliper 12 is movable in the axial direction, i.e., in the right-left direction in FIG. 1, and such that the caliper 12 straddles the disc rotor 14. The pads 16a, 16b are held by the mount so as to sandwich the disc rotor 14 therebetween in a state in which the pads 16a, 16b are movable in the axial direction. Each of the pads 16a, 16b includes: a friction member 26 disposed on one side thereof on which the pad 16a, 16b comes into contact with the disc rotor 14; and a backup plate 28 supporting the friction member 26. The friction member 26 of each pad 16a, 16b is configured to be pushed onto the disc rotor 14. Each of the pads 16a, 16b itself may be referred to as the friction member.

For the sake of convenience, the left side and the right side in FIG. 1 are defined as a front side and a rear side, respectively. The pad 16a located on the front side is supported by a front end portion (claw portion) 32 of a caliper main body 30. The actuator 10 is held by a rear-side portion of the caliper main body 30 such that a housing 40 of the actuator 10 is fixed to the rear-side portion of the caliper main body 30. The actuator 10 includes a piston 42 held by the housing 40 so as to be advanceable and retractable. When the piston 42 advances, a distal end portion, specifically, a front end, of the piston 42 comes into engagement with the pad 16b located on the rear side, specifically, the backup plate 28 of the rear-side pad 16b. When the piston 42 further advances while being kept engaged with the backup plate 28 of the rear-side pad 16b, the pads 16a, 16b sandwich or nip the disc rotor 14 therebetween. In other words, the friction members 26 of the pads 16a, 16b are pushed onto the disc rotor 14. Owing to the pushing by the pads 16a, 16b, there is generated a braking force for stopping rotation of the wheel that depends on a friction force between the disc rotor 14 and the friction members 26, in other words, there is generated a braking force for reducing the speed of the vehicle or stopping the vehicle.

B. Basic Structure of Electric Brake Actuator

Figure 2:
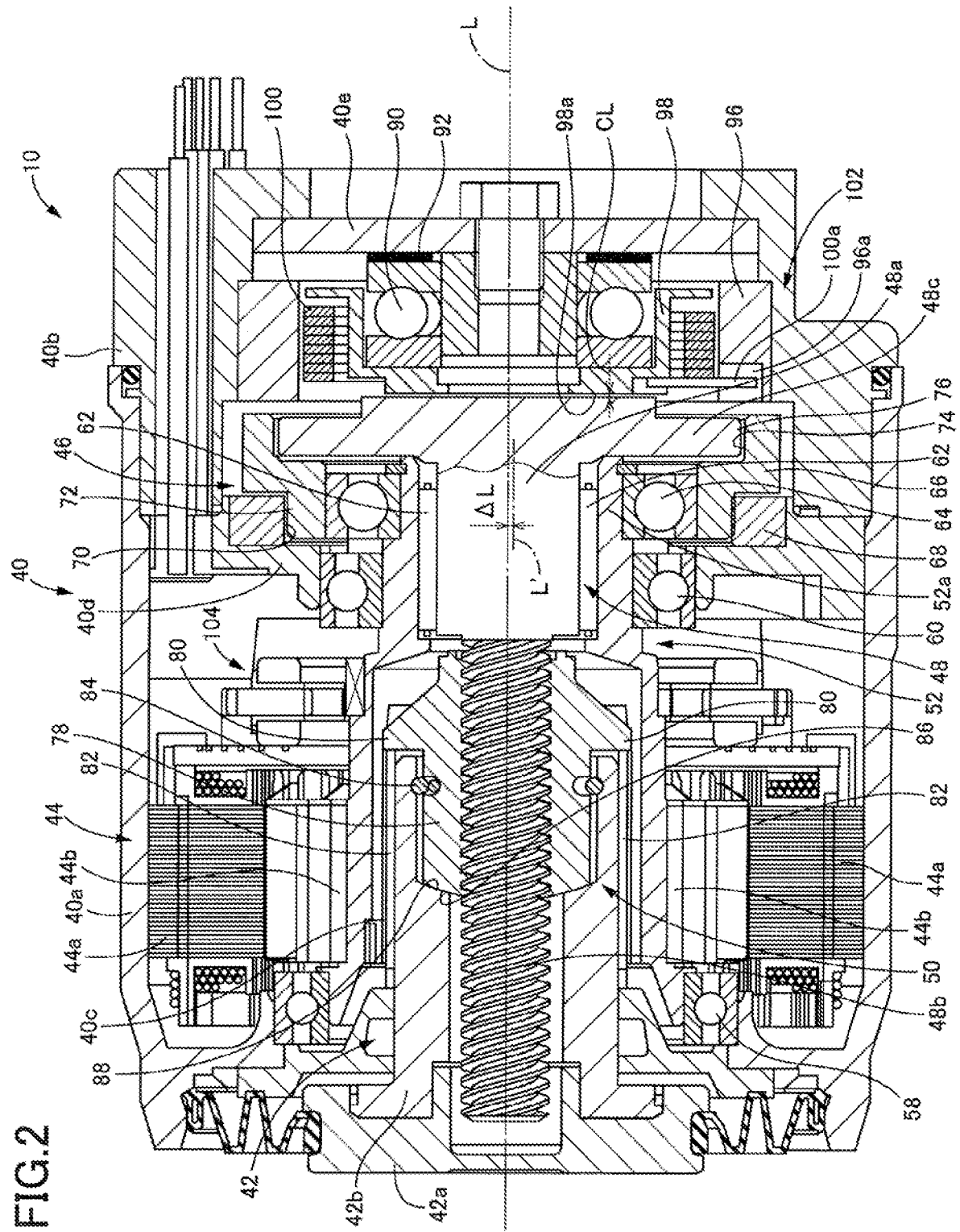
FIG. 2 is a cross-sectional view of the electric brake actuator according to the embodiment.

As shown in FIG. 2, the actuator 10 according to the present embodiment includes the housing 40 as a main body of the actuator 10, the piston 42, an electric motor (three-phase DC brushless motor) 44 as a drive source, a speed reduction mechanism 46 for decelerating rotation of the electric motor 44, and a motion converting mechanism 50 including a rotational shaft 48 configured to be rotated by the rotation of the electric motor 44 decelerated by the speed reduction mechanism 46 and configured to convert the rotational motion of the rotational shaft 48 into an advancing and retracting movement (forward and backward movement) of the piston 42. The motion converting mechanism 50 is considered as a mechanism for converting the rotational motion of the electric motor 44 into the advancing and retracting movement of the piston 42. In the following description, the left side and the right side in FIG. 2 are defined as a front side and a rear side, respectively, for the sake of convenience.

The housing 40 is constituted by: a front-side casing 40a and a rear-side casing 40b each having a generally cylindrical shape; an inner sleeve 40c which is supported at a front end portion thereof by the front-side casing 40a and in which the piston 42 is disposed; a generally annular support wall 40d disposed radially inward of the front-side casing 40a and supported by a front end of the rear-side casing 40b; and a support plate 40e fixedly held by a rear end portion of the rear-side casing 40b.

The piston 42 includes a piston head 42a and a hollow piston cylinder 42b. The piston 42 is configured such that a front end of the piston head 42a, which constitutes the distal end portion of the piston 42, comes into engagement with the friction member 26 of the brake pad 16b via the backup plate 28. The actuator 10 includes a cylindrically shaped hollow shaft 52. A front-side portion of the hollow shaft 52 functions as a motor shaft (rotor) that is a rotary drive shaft of the electric motor 44, and a rear-side portion of the hollow shaft 52 functions as an input shaft of the speed reduction mechanism 46 as explained below in detail. In other words, the electric motor 44 is of a type in which the hollow motor shaft is rotated. In the following explanation, the hollow shaft 52 is considered as being formed by integrating the motor shaft of the electric motor 44 and the input shaft of the speed reduction mechanism 46 that is configured to be rotated by the electric motor 44. In short, the hollow shaft 52 itself can be regarded as the input shaft of the speed reduction mechanism 46. Conversely, the hollow shaft 52 itself can be regarded as the motor shaft of the electric motor 44. The electric motor 44 is constituted by: coils 44a held by the front-side casing 40a of the housing 40 so as to be fixed to an inner circumference of the front-side casing 40a; and magnets 44b provided on an outer circumference of the front-side portion of the hollow shaft 52 so as to be opposed to the coils 44a.

The hollow shaft 52 is disposed such that the front-side portion thereof incorporates the inner sleeve 40c. Further, the hollow shaft 52 is supported by the housing 40 through two radial ball bearings 58, 60 so as to be rotatable about an axis L that is a center axis of the actuator 10 and so as to be immovable in an axial direction that is a direction of extension of the axis L. A positional relationship between the piston 42 and the hollow shaft 52 functioning as the motor shaft is as follows. That is, the rear end portion of the piston 42 is disposed inside the hollow shaft 52.

The rotational shaft 48 is disposed in the hollow shaft 52 that is the motor shaft, so as to be coaxially with the hollow shaft 52. The rotational shaft 48 is constituted by integrally formed three portions, i.e., a shaft portion 48a functioning as an output shaft of the speed reduction mechanism 46, an external thread portion 48b which is located on the front side of the shaft portion 48a and is externally threaded, and a flange portion 48c provided at a rear end of the shaft portion 48a. The rotational shaft 48 is supported at the shaft portion 48a thereof by an inner circumferential portion of the hollow shaft 52 through rollers (that are also referred to as needles) 62, such that the rotational shaft 48 is rotatable about the axis L.

In addition to the hollow shaft 52 functioning as the input shaft and the rotational shaft 48 whose shaft portion 48a functions as the output shaft, the speed reduction mechanism 46 includes a planetary gear member 66 supported by a rear portion of the hollow shaft 52 through a radial ball bearing 64 so as to be rotatable and immovable in the axial direction. The rear portion of the hollow shaft 52 that supports, on its outer circumference, the planetary gear member 66 through the radial ball bearing 64 has an axis L' defined by its outer circumferential surface, the axis L' being eccentric with respect to the axis L by an eccentric amount ΔL. This rear portion will be hereinafter referred to as an eccentric shaft portion 52a, and the axis L' will be hereinafter referred to as an eccentric axis L'. In this configuration, the planetary gear member 66 is configured to not only rotate about the eccentric axis L', but also revolve about the axis L in conjunction with rotation of the hollow shaft 52 about the axis L.

Figure 3B:
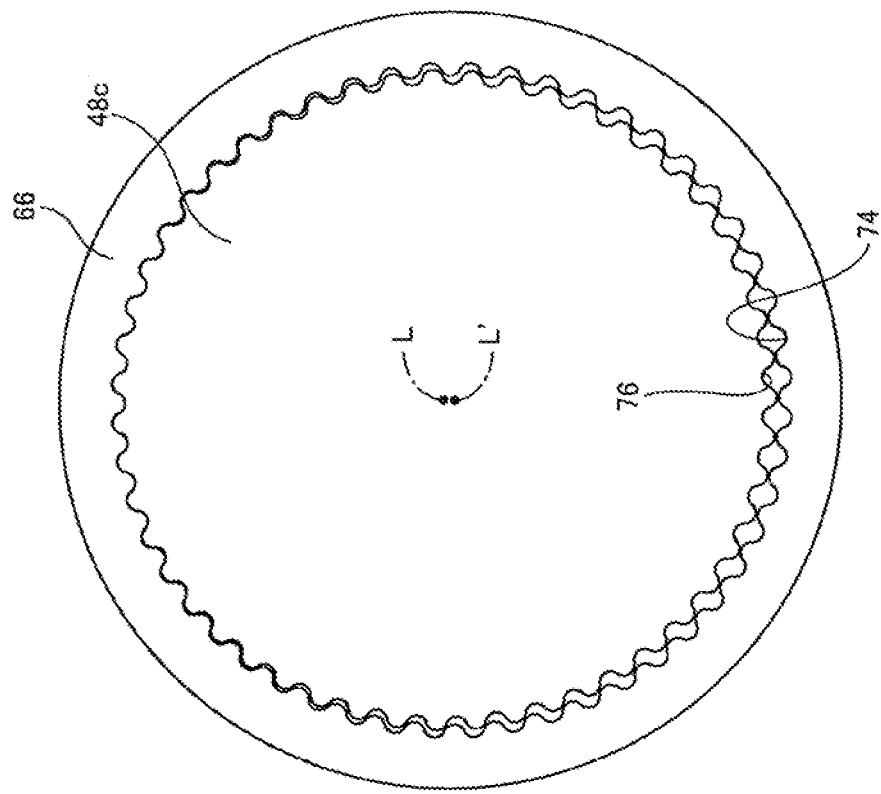
FIGS. 3A and 3B are views for explaining a speed reduction mechanism of the electric brake actuator according to the embodiment.
Figure 3A:
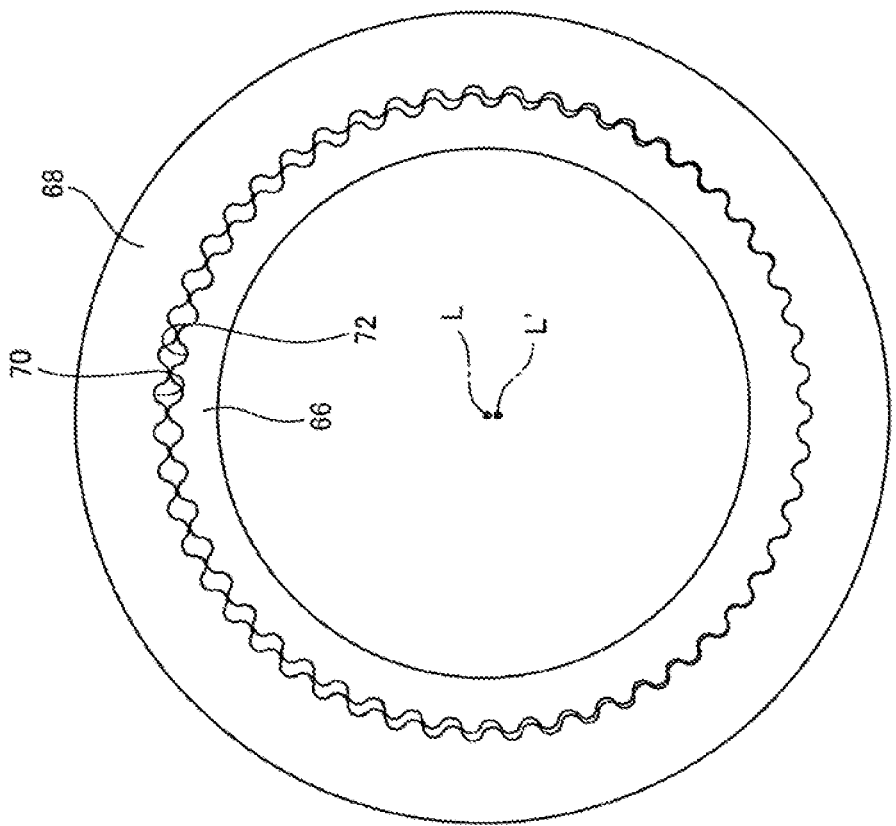

The speed reduction mechanism 46 further includes a ring gear member 68 that is fixedly supported by the support wall 40d of the housing 40. As also shown in FIG. 3A, a first internally toothed gear 70 is formed on the ring gear member 68. Further, a first externally toothed gear 72, a part of which is in mesh with a part of the first internally toothed gear 70, is formed at a radially outer portion of the planetary gear member 66. As also shown in FIG. 3B, a second internally toothed gear 74 is formed at the radially outer portion of the planetary gear member 66 so as to be arranged side by side with the first externally toothed gear 72 in the axial direction. Further, a second externally toothed gear 76, a part of which is in mesh with a part of the second internally toothed gear 74, is formed at a radially outer portion of the flange portion 48c of the rotational shaft 48.

The center of the first internally toothed gear 70 lies on the axis L while the center of the first externally toothed gear 72 lies on the eccentric axis L'. The center of the second internally toothed gear 74 lies on the eccentric axis L' while the center of the second externally toothed gear 76 lies on the axis L. The meshing position of the first internally toothed gear 70 and the first externally toothed gear 72 is located opposite to the meshing position of the second internally toothed gear 74 and the second externally toothed gear 76 with respect to the axis L or the eccentric axis L'. That is, those meshing positions are different from each other in phase by 180° in the circumferential direction. In other words, the speed reduction mechanism 46 is a differential speed reduction device including: a first internally meshing planetary gear mechanism constituted by the first internally toothed gear 70 and the first externally toothed gear 72 that is meshing internally with the first internally toothed gear 70; and a second internally meshing planetary gear mechanism constituted by the second internally toothed gear 74 and the second externally toothed gear 76 that is meshing internally with the second internally toothed gear 74.

The first internally toothed gear 70 has a circular arc tooth profile, and the first externally toothed gear 72 has an epitrochoid parallel curve tooth profile. Similarly, the second internally toothed gear 74 has a circular arc tooth profile, and the second externally toothed gear 76 has an epitrochoid parallel curve tooth profile. Thus, the speed reduction mechanism 46 is constructed as a cycloid speed reducer. The thus constructed speed reduction mechanism 46 achieves a mechanism in which the number of teeth of the first internally toothed gear 70 and the number of teeth of the first externally toothed gear 72 differ from each other only by one and the number of teeth of the second internally toothed gear 74 and the number of teeth of the second externally toothed gear 76 differ from each other only by one. Accordingly, the speed reduction mechanism 46 is constructed as a speed reduction mechanism which has a high reduction ratio (i.e., a considerably small ratio of the rotation speed of the rotational shaft 48 as the output shaft with respect to the rotation speed of the hollow shaft 52 as the input shaft) and which is capable of performing smooth deceleration.

As shown in FIG. 2, the motion converting mechanism 50 is constituted by the rotational shaft 48, specifically, the external thread portion 48b of the rotational shaft 48, and a nut 78 that is threadedly engaged with the external thread portion 48b and functions as a movable member. Each of an external thread of the external thread portion 48b and an internal thread of the nut 78 is a trapezoidal thread and is a multiple thread, specifically, a triple thread in the present actuator 10. Two protrusions 80 each functioning as a key are formed on an outer circumference of the nut 78. The two protrusions 80 are respectively held in engagement with two slots 82 formed on the inner sleeve 40c of the housing 40 so as to extend in the axial direction. Owing to the engagement of the protrusions 80 and the slots 82, the nut 78 is movable in the axial direction while being prohibited from rotating about the axis L. In this respect, an internal thread may be formed on the rotational shaft 48, and there may be provided a movable member which has an external thread threadedly engaged with the internal thread and which is configured to be advanced and retracted by the rotation of the rotational shaft 48.

A front-side portion of the nut 78 as the movable member is disposed in a rear-side portion of the piston cylinder 42b of the piston 42, and the piston 42 is prohibited from being withdrawn from the nut 78 by a stopper ring 84. A distal end face 86 of the nut 78 is held in contact with a contact surface 88 formed in the piston cylinder 42b. A forward force of the nut 78 is transmitted as a forward force of the piston 42 via the mutually contacting distal end face 86 and contact surface 88. The forward force of the piston 42 functions as a force by which the piston 42 pushes the friction members 26 of the brake pads 16a, 16b onto the disc rotor 14, i.e., a pushing force. A force that causes the piston 42 to be inclined in the radial direction may act on the piston 42 when the piston 42 is pushing the friction members 26, due to uneven wear of the friction members 26 of the brake pads 16a, 16b, inclination of the disc rotor 14 in turning of the vehicle, or the like. Though not explained in detail, in such a case, the distal end face 86 and the contact surface 88 are allowed to be shifted or moved relative to each other in the radial direction, so that the piston 42 is allowed to be inclined to some extent. That is, the actuator 10 includes a piston inclination allowing mechanism.

The rotational shaft 48 is supported, at the flange portion 48c formed at its rear end, by the housing 40 through a thrust bearing, namely, a thrust ball bearing 90. Specifically, a pushing-force sensor 92 is disposed between the thrust ball bearing 90 and the support plate 40e for detecting the pushing force (axial force). The rotational shaft 48 is supported by the support plate 40e of the housing 40 also through the pushing-force sensor 92. In this respect, the pushing-force sensor 92 is what is called load cell. The detailed structure of the pushing-force sensor 92 is not illustrated. Specifically, the actuator 10 includes a retracting torque applying mechanism 102 constituted by a stator 96, a rotor 98, and a torsion coil spring 100 that is a torsion spring. The rotor 98 is disposed between the thrust ball bearing 90 and the flange portion 48c of the rotational shaft 48. A slight clearance CL is present between the rotor 98 and the flange portion 48c. (The clearance CL is exaggeratedly illustrated in FIG. 2.) When the piston 42 advances and the friction members 26 are pushed onto the disc rotor 14, the rotational shaft 48 is slightly retracted by a reaction force of the pushing force and the clearance CL is removed by contact of the flange portion 48c and a front end face 98a of the rotor 98, so that the rotational shaft 48 is supported, at its rear end, namely, at the flange portion 48c formed at the rear end, by the housing 40 through the thrust ball bearing 90.

The actuator 10 includes, in addition to the pushing-force sensor 92, a rotation angle sensor 104 for detecting a rotation angle (rotational phase) of the hollow shaft 52 that is the motor shaft. The rotation angle sensor 104 is a resolver.

As shown in FIG. 1, the ECU 18 as the controller includes a computer 110 constituted by a CPU, a RAM, a ROM, etc., and an inverter 112 that is a drive circuit (driver) of the electric motor 44. A pushing force FS detected by the pushing-force sensor 92 and a rotation angle θ of the hollow shaft 52 detected by the rotation angle sensor 104 are transmitted to the computer 110 and the inverter 112.

The control of the actuator 10 will be briefly explained. The computer 110 determines a required braking force that is a braking force to be generated by the electric brake device based on a degree of operation of a brake operation member such as a brake pedal. Based on the determined required braking force, the computer 110 determines a target pushing force that is a target of the pushing force FS. The computer 110 then determines a target supply current that is an electric current I to be supplied to the electric motor 44, such that the pushing force FS detected by the pushing-force sensor 92 becomes equal to the target pushing force. The inverter 112 controls the electric motor 44 based on the detected rotation angle θ according to the target supply current. It is desirable that a suitable clearance be formed between the disc rotor 14 and the pads 16a, 16b in a state in which the required braking force is 0, that is, in a state in which the braking force request is not made, for keeping a good response while avoiding the drag phenomenon. To this end, the operation of the electric motor 44 is controlled based on the rotation angle θ for retracting the piston 42 by a set distance in the decreasing process of the braking force from a time point when the pushing force FS becomes equal to 0.

C. Retracting Torque Applying Mechanism

When the actuator 10 suffers from an electric failure that causes the electric motor 44 to fail to operate in a state in which the braking force is being generated, there may be cases where the piston 42 cannot be retracted by the operation of the electric motor 44 and the drag phenomenon cannot be cancelled. In view of this, the actuator 10 includes the retracting torque applying mechanism 102 as a mechanism for applying, to the rotational shaft 48, a retracting torque that is a torque in a direction to retract the piston 42.

Figure 4:
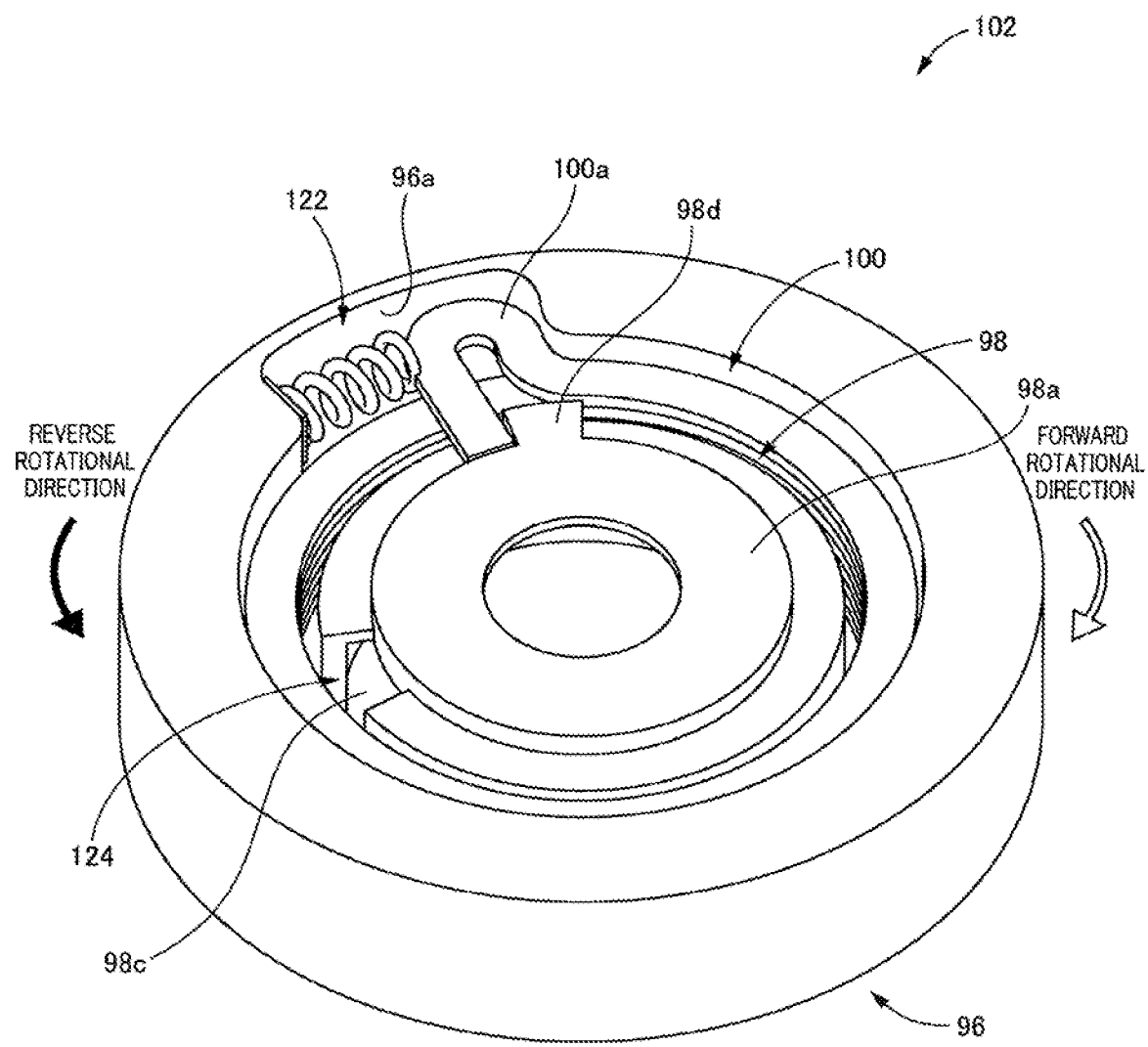
FIG. 4 is an overall perspective view of a retracting torque applying mechanism of the electric brake actuator according to the embodiment.
Figure 5:
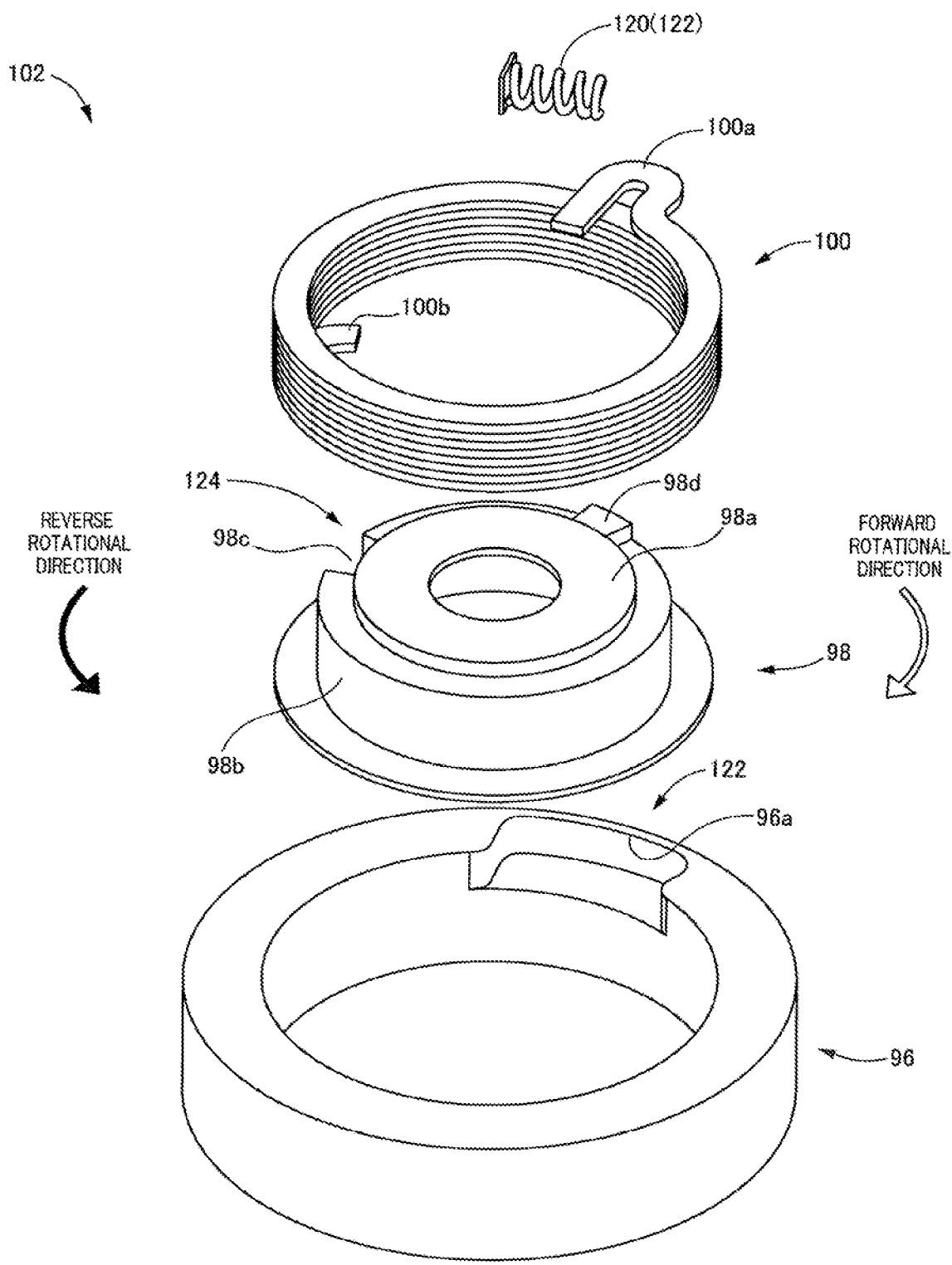
FIG. 5 is an exploded view of the retracting torque applying mechanism of the electric brake actuator according to the embodiment.

The retracting torque applying mechanism 102 will be explained referring also to the perspective view of FIG. 4 and the exploded view of FIG. 5. As explained above, the retracting torque applying mechanism 102 is constituted by the torsion coil spring 100 as the torsion spring, the stator 96 fixedly provided on the housing 40 and retaining one end portion 100a of the torsion coil spring 100, and the rotor 98 retaining the other end portion 100b of the torsion coil spring 100 and configured to be rotated relative to the stator 96 so as to twist the torsion coil spring 100. In the following explanation, the rotational direction of the rotational shaft 48 is defined as follows. That is, the rotational direction of the rotational shaft 48 when the piston 42 advances is defined as a forward rotational direction, and the rotational direction of the rotational shaft 48 when the piston 42 retracts is defined as a reverse rotational direction. Further, the rotational direction of the rotor 98 and the direction of the rotational displacement of any portion of the torsion coil spring 100 are similarly defined, that is, a forward rotational direction in the actuator 10 and a reverse rotational direction in the actuator 10 are defined as illustrated in FIGS. 4 and 5.

The stator 96 has a generally ring-like shape. The stator 96 includes a recessed portion 96a formed at a part of its inner circumferential portion so as to be recessed in the radial direction and in the axial direction. The rotor 98 has a generally hat-like shape. The rotor 98 includes a cutout 98c formed at a part of its cylindrical portion 98b. The rotor 98 is disposed inside the stator 96 so as to be generally coaxial with the stator 96. The torsion coil spring 100 is formed by winding, in multiple turns, a wire whose cross section is rectangular. The torsion coil spring 100 is disposed in a space between the inner circumferential surface of the stator 96 and the outer circumferential surface of the cylindrical portion 98b of the rotor 98, so as to be generally coaxial with the stator 96 and the rotor 98.

The one end portion 100a of the torsion coil spring 100 has a generally U-like shape. The U-like one end portion 100a of the torsion coil spring 100 protrudes radially outward at a part thereof corresponding to the bottom of the U-like shape and protrudes radially inward at a part thereof corresponding to one of distal ends of the U-like shape. The one end portion 100a is retained in the recessed portion 96a of the stator 96. There is disposed, in the recessed portion 96a, a compression coil spring 120 as a biasing member. The compression coil spring 120 will be hereinafter simply referred to as "spring 120" where appropriate. FIG. 4 illustrates a state in which the retracting torque applying mechanism 102 is not applying the retracting torque. This state will be hereinafter referred to as "standby state" where appropriate. In the standby state, the spring 120 is compressed to some extent and biases the one end portion 100a of the torsion coil spring 100 in the forward rotational direction. That is, the recessed portion 96a of the stator 96 and the spring 120 constitute a first retaining portion 122 retaining the one end portion 100a of the torsion coil spring 100. The first retaining portion 122 prohibits a displacement of the one end portion 100a in the forward rotational direction and allows a displacement of the one end portion 100a in the reverse rotational direction against the biasing force of the spring 120.

The distal end of the other end portion 100b of the torsion coil spring 100 protrudes radially inward. Thus, the other end portion 100b has a hook-like shape. The other end portion 100b is retained by the cutout 98c of the rotor 98. That is, the cutout 98c functions as a second retaining portion 124 retaining the other end portion 100b of the torsion coil spring 100. Specifically, the second retaining portion 124 prohibits the other end portion 100b of the torsion coil spring 100 from being displaced in the reverse rotational direction relative to the rotor 98.

The retracting torque applying mechanism 102 is provided with a protrusion 98d. The protrusion 98d is formed at a part in the circumferential direction of a front end portion of the rotor 98, so as to protrude radially outward from the outer circumference of the front end face 98a. The protrusion 98d is retained by the one end portion 100a of the torsion coil spring 100. Specifically, the rotor 98 is prohibited from being displaced in the reverse rotational direction relative to the torsion coil spring 100 by contact of the protrusion 98*d* with the one end portion 100*a*. In the state illustrated in FIG. 4, namely, in the standby state, the torsion coil spring 100 is twisted to some extent from its natural state (i.e., a state in which the elastic torque is not being generated). That is, in a state in which some extent of the elastic torque is being generated, the other end portion 100*b* of the torsion coil spring 100 is retained by the cutout 98*c*, and the one end portion 100*a* of the torsion coil spring 100 retains the protrusion 98*d* of the rotor 98. Thus, the retracting torque applying mechanism 102 includes a lower limit torque ensuring mechanism for causing the torsion coil spring 100 to always generate some extent of the elastic torque, namely, the elastic torque that is not less than a set elastic torque. In other words, the retracting torque applying mechanism 102 includes a lower limit torque ensuring mechanism configured to prohibit the elastic torque that is being generated by the torsion coil spring 100 from becoming less than the set elastic torque (hereinafter referred to as "lower limit torque" where appropriate). Viewed differently, the lower limit torque ensuring mechanism is configured such that, in a state in which the torsion coil spring 100 is generating the set lower limit torque, the other end portion 100*b* is prohibited, by the cutout 98*c*, from being displaced in the reverse rotational direction relative to the rotor 98 and such that the one end portion 100*a* prohibits the rotor 98 from rotating in the reverse rotational direction relative to the one end portion 100*a*.

As explained above with reference to FIG. 2, a slight clearance CL is present between the front end face 98*a* of the rotor 98 and the flange portion 48*c*. When the piston 42 advances and the friction members 26 are pushed onto the disc rotor 14, the rotational shaft 48 is slightly retracted by the reaction force of the pushing force and the clearance CL is removed by contact of the flange portion 48*c* and the front end face 98*a* of the rotor 98. When the pushing force FS detected by the pushing-force sensor 92 becomes equal to a set pushing force $FS_0$, the rotational shaft 48 and the rotor 98 are prohibited from rotating relative to each other by action of a friction force between the flange portion 48*c* and the front end face 98*a* of the rotor 98. In a state in which the rotational shaft 48 receives the reaction force, i.e., in a state in which a substantial braking force is being generated, the rotor 98 and the rotational shaft 48 are rotatable together as a unit. In a state in which the rotational shaft 48 does not receive the reaction force, i.e., in a state in which the substantial braking force is not being generated, the flange portion 48*c* and the front end face 98*a* of the rotor 98 are spaced apart from each other, and the rotational shaft 48 and the rotor 98 are allowed to rotate relative to each other. That is, the retracting torque applying mechanism 102 includes a clutch mechanism configured to prohibit the relative rotation of the rotor 98 and the rotational shaft 48 only in the state in which the electric brake device is generating the substantial braking force. In relation to the clutch mechanism, the state in which the rotor 98 and the rotational shaft 48 are rotatable together as a unit will be hereinafter referred to as "clutch ON state", and the state in which the relative rotation of the rotor 98 and the rotational shaft 48 is allowed will be hereinafter referred to as "clutch OFF state".

Figure 6:
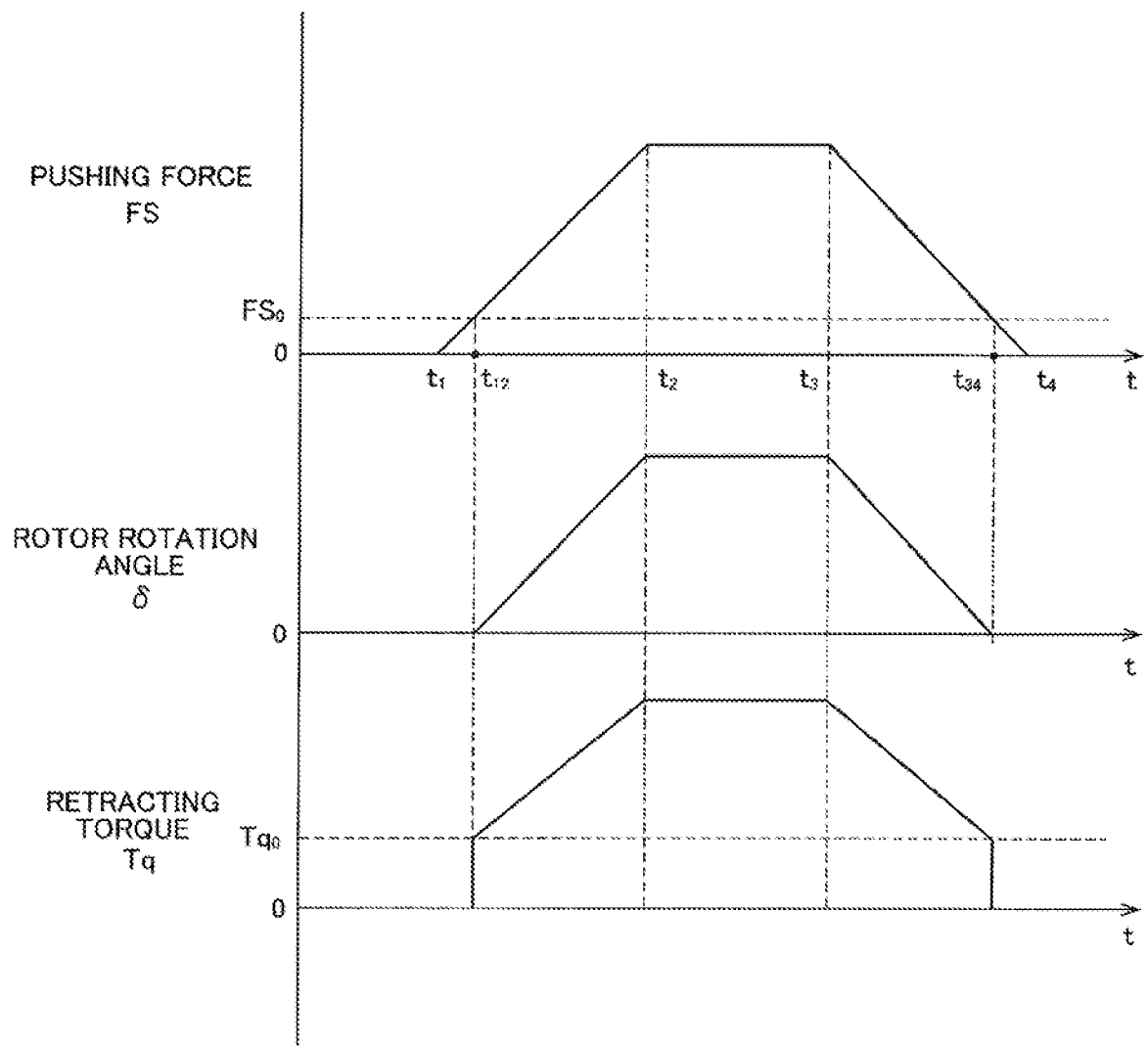
FIG. 6 is a graph for explaining an action of the retracting torque applying mechanism in an instance where a typical brake operation is performed in an ideal condition.
Figure 7A:
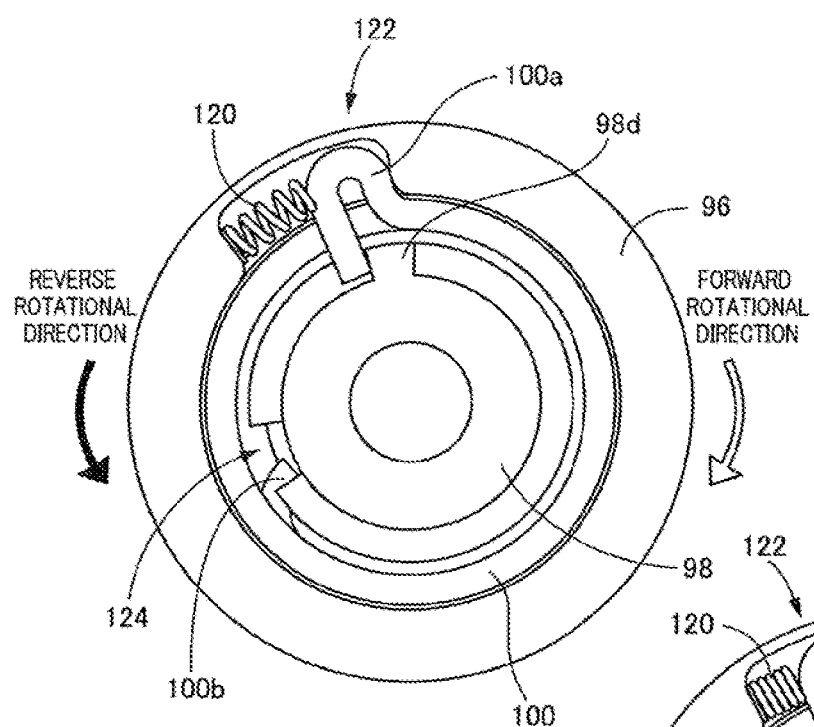
FIGS. 7A-7C are views of the retracting torque applying mechanism in various states.

Referring to the graph of FIG. 6 and FIGS. 7A and 7B, the action of the retracting torque applying mechanism 102 will be explained. The graph of FIG. 6 indicates temporal changes of the pushing force FS, a rotation angle δ of the rotor 98 relative to the stator 96, and a retracting torque Tq applied by the retracting torque applying mechanism 102 in an instance where a typical brake operation is performed in an ideal condition.

The brake operation starts at a time point $t_1$. In a time period from the time point $t_1$ to a time point $t_2$ during which the pushing force FS increases, the rotational shaft 48 is rotated in the forward rotational direction, so that the braking force is increased. The clutch OFF state is switched to the clutch ON state at a time point when the substantial braking force is generated, namely, at a time point $t_{12}$ when the pushing force FS becomes equal to the set pushing force $FS_0$. In the clutch OFF state, the retracting torque applying mechanism 102 is in a state illustrated in FIG. 7A, i.e., the standby state. After the clutch ON state has been established, the rotor 98 is rotated in the forward rotational direction as illustrated in FIG. 7B with an increase in the braking force, namely, with an increase in the pushing force FS. The rotation of the rotor 98 in the forward rotational direction causes the torsion coil spring 100 to be twisted, so that the retracting torque Tq is increased. As explained above, the retracting torque applying mechanism 102 includes the lower limit torque ensuring mechanism. Owing to the lower limit torque ensuring mechanism, the torsion coil spring 100 is generating the elastic torque equal to the set lower limit torque even in the standby state. Thus, at the time point $t_{12}$ when the state established by the clutch mechanism is switched from the clutch OFF state to the clutch ON state, there is applied, to the rotational shaft 48, a lower limit retracting torque $Tq_0$ having a magnitude corresponding to the set lower limit torque being generated by the torsion coil spring 100. Thereafter, the retracting torque Tq increases from the lower limit retracting torque $Tq_0$ with an increase in the pushing force FS.

The braking force, namely, the pushing force FS, becomes constant at the time point $t_2$. Thereafter, the brake operation that decreases the braking force causes the rotational shaft 48 to be rotated in the reverse rotational direction in a time period from a time point $t_3$ to a time point $t_4$, and the pushing force FS is accordingly decreased. At a time point $t_{34}$ in the time period from the time point $t_3$ to the time point $t_4$, the pushing force FS becomes equal to the set pushing force $FS_0$, and the clutch ON state is switched to the clutch OFF state. During a time period from the time point $t_3$ to the time point $t_{34}$, the torsion coil spring 100 is untwisted by the rotation of the rotor 98 in the reverse rotational direction, and the retracting torque Tq is decreased down to the lower limit retracting torque $Tq_0$.

As explained above, when the substantial braking force is being generated, the retracting torque applying mechanism 102 applies, to the rotational shaft 48, the retracting torque Tq that depends on the elastic torque of the torsion coil spring 100. The retracting torque Tq is a torque in the reverse rotational direction. Accordingly, even if there occurs a situation in which the electric motor 44 cannot be operated due to an electric failure or the like, for instance, the present actuator 10 enables the piston 42 to be retracted by the retracting torque Tq. Thus, the present actuator 10 effectively prevents what is called drag phenomenon even in the event of an occurrence of the situation in which the electric motor 44 cannot be operated in a state in which the braking force is being generated.

In the actuator 10, negative efficiency (reverse efficiency) of the motion converting mechanism 50 is considerably low. Thus, the retracting torque applying mechanism 102 that applies the retracting torque to the rotational shaft 48 is a particularly significant mechanism. Further, the retracting torque Tq applied by the retracting torque applying mechanism 102 is made equal to or larger than the lower limit retracting torque $Tq_0$ by the lower limit torque ensuring mechanism explained above. This configuration enables the piston 42 to be retracted by a sufficient force even when the electric motor 44 fails to operate. Though the set pushing force $FS_0$ is exaggeratedly depicted in the graph of FIG. 6, the set pushing force $FS_0$ is considerably small. Thus, even if the electric motor 44 fails to operate in a state in which the pushing force FS is less than the set pushing force $FS_0$, this does not substantially cause any adverse effect.

The retracting torque applying mechanism 102 includes the clutch mechanism that selectively establishes the clutch ON state and the clutch OFF state in dependence on the pushing force FS. The clutch mechanism establishes the clutch OFF state when the braking force is not being generated. Thus, the actuator 10 eliminates the necessity to supply the electric current to the electric motor 44 against the retracting torque when the braking force is not being generated, in order to appropriately keep the clearance CL between the friction member 26 and the disc rotor 14.

There has been described above the action of the retracting torque applying mechanism 102 in relation to the brake operation in the ideal condition. The braking force, however, is not generated necessarily in the ideal condition. There will be explained below the action of the retracting torque applying mechanism 102 in a particular condition.

Actually, a relationship between the braking force and the rotation amount of the rotational shaft 48 when the braking force is increased differs from a relationship between the braking force and the rotation amount of the rotational shaft 48 when the braking force is deceased, due to the facts that the friction member 26 is formed of an elastic body and frictional hysteresis exists in the motion converting mechanism 50, for instance. Specifically, the decrease timing of the braking force when the rotational shaft 48 is rotated in the reverse rotational direction delays as compared with the increase timing of the braking force when the rotational shaft 48 is rotated in the forward rotational direction. In other words, the rotation amount (rotational position) of the rotational shaft 48 in the decreasing process of the braking force when a certain magnitude of the braking force is being generated is smaller than the rotation amount (rotational position) of the rotational shaft 48 in the increasing process of the braking force when the certain magnitude of the braking force is being generated.

Figure 8A:
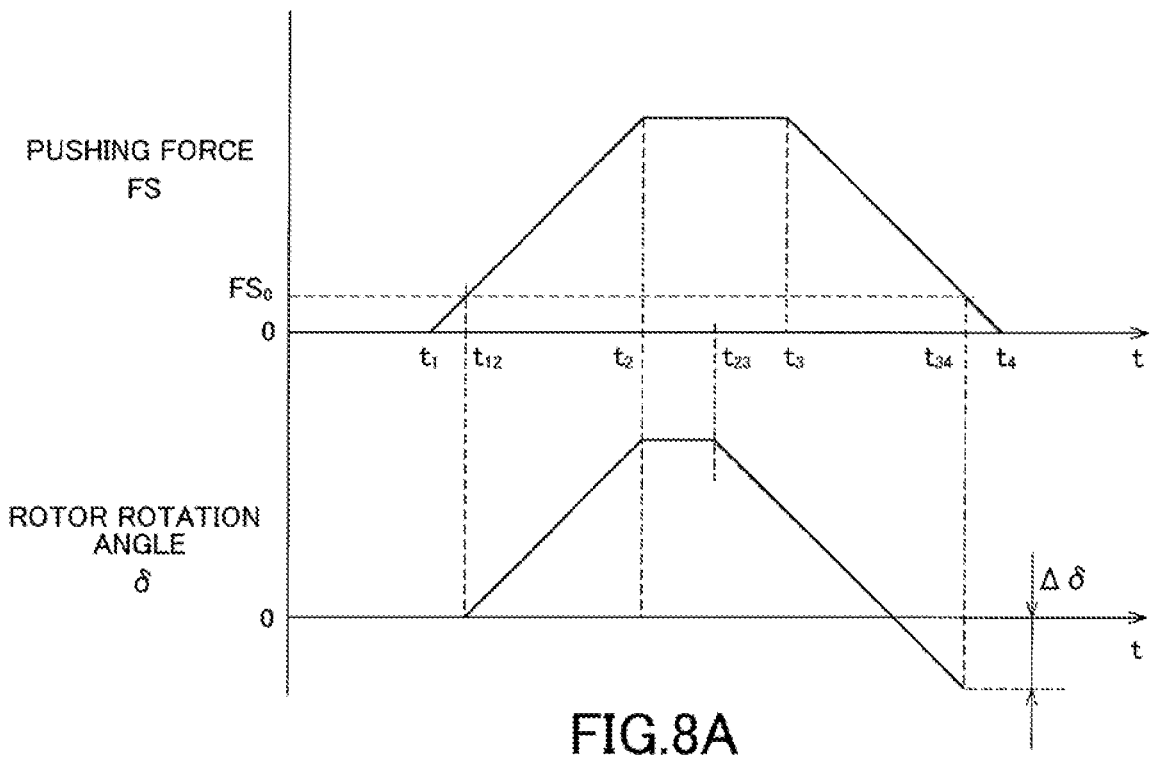
FIGS. 8A and 8B are graphs each for explaining an action of the retracting torque applying mechanism in a particular condition.

As apparent from a relationship between the pushing force FS and the rotation angle δ of the rotor 98 illustrated in FIG. 8A, when the braking force is decreased from the time point $t_3$, the rotation of the rotational shaft 48 in the reverse rotational direction actually starts at a time point $t_{23}$ and the rotation of the rotor 98 in the reverse rotational direction starts from the time point $t_{23}$. The rotor 98 continues to be rotated in the reverse rotational direction till a time point $t_{34}$ at which the pushing force FS becomes equal to the set pushing force $FS_0$ as a result of the decrease of the braking force. In this instance, the rotor 98 is rotated in the reverse rotational direction farther than in the standby state illustrated in FIG. 7A. That is, the rotor 98 is rotated farther in the reverse rotational direction by a reverse rotational amount Δδ illustrated in FIG. 8A. Conversely, it can be considered that, due to the hysteresis, a braking force remaining situation is occurring in which the clutch ON state still continues at a time point when the clutch OFF state should be established in the decreasing process of the braking force and the braking force still remains. To cancel such a situation, the rotational shaft 48 is rotated in the reverse rotational direction so as to cause the rotor 98 to be rotated in the reverse rotational direction under the clutch ON state.

A configuration is considered in which the retaining structure for retaining the one end portion 100a of the torsion coil spring 100 by the first retaining portion 122 does not allow the displacement of the one end portion 100a in the reverse rotational direction. That is, a configuration is considered in which the one end portion 100a is merely fixed to the stator. In such a configuration, owing to the action of the lower limit torque ensuring mechanism, the protrusion 98d of the rotor 98 is retained by the one end portion 100a in the standby state, whereby the rotor 98 cannot be rotated in the reverse rotational direction beyond the standby state. If the rotor 98 is forcibly rotated in the reverse rotational direction, the retracting torque applying mechanism 102 receives an excessive force, so that the retracting torque applying mechanism 102 may be undesirably damaged. In this respect, in a configuration in which the protrusion 98d of the rotor 98 is not retained by the one end portion 100a, namely, in a configuration not equipped with the lower limit torque ensuring mechanism, the torsion coil spring 100 can be twisted in the reverse rotational direction beyond its natural state, so that the retracting torque applying mechanism 102 suffers from an excessive force also in this configuration.

Figure 7C:
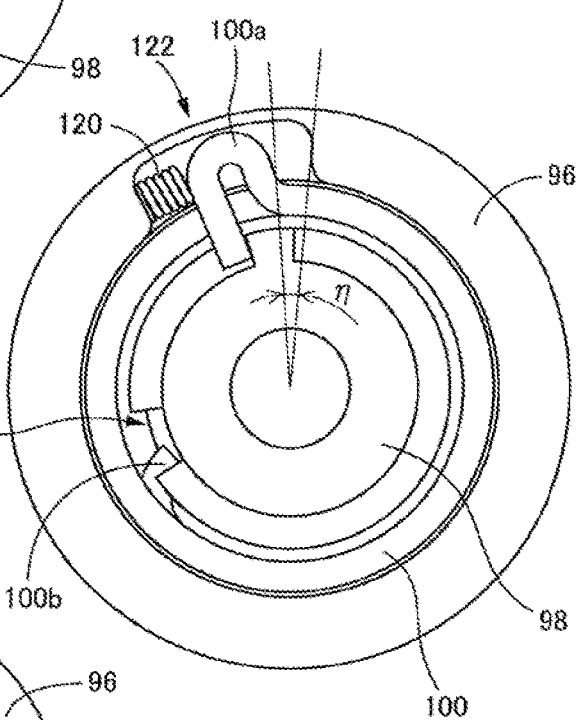
Figure 7B:
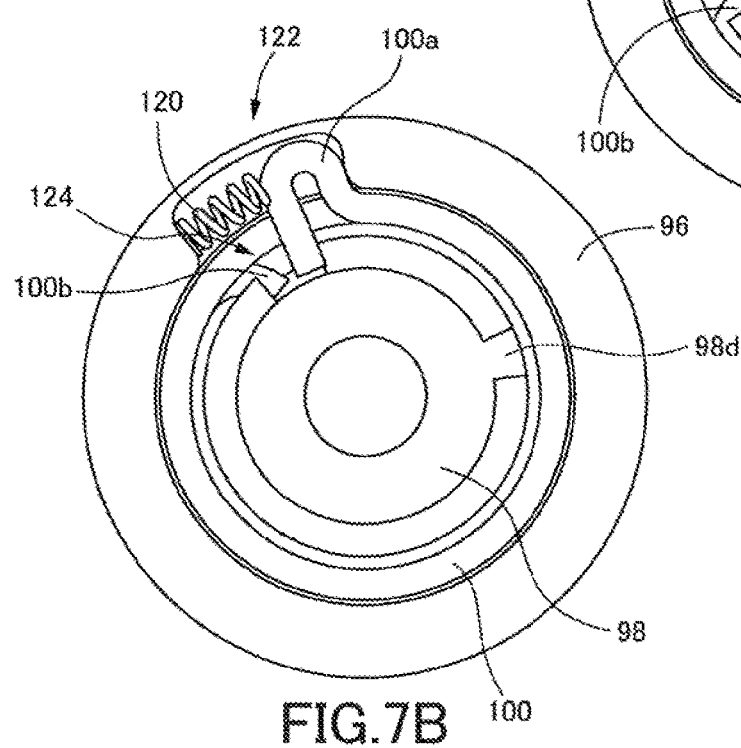

In the actuator 10, therefore, the first retaining portion 122 includes the spring 120 as illustrated in FIG. 7C, and the one end portion 100a of the torsion coil spring 100 is allowed to be displaced in the reverse rotational direction against the biasing force (the compression reaction force) of the spring 120. The one end portion 100a is allowed to be displaced in in the reverse rotational direction until the spring 120 is compressed to a maximum extent. An allowable angular range η of the displacement of the one end portion 100a in the reverse rotational direction is not less than 10°. This allowable range enables the reverse rotational amount Δδ to be sufficiently accommodated. Thereafter, the clutch OFF state is established at the time point $t_{34}$, and, at the same time point, the retracting torque applying mechanism 102 returns to the standby state illustrated in FIG. 7A.

Figure 8B:
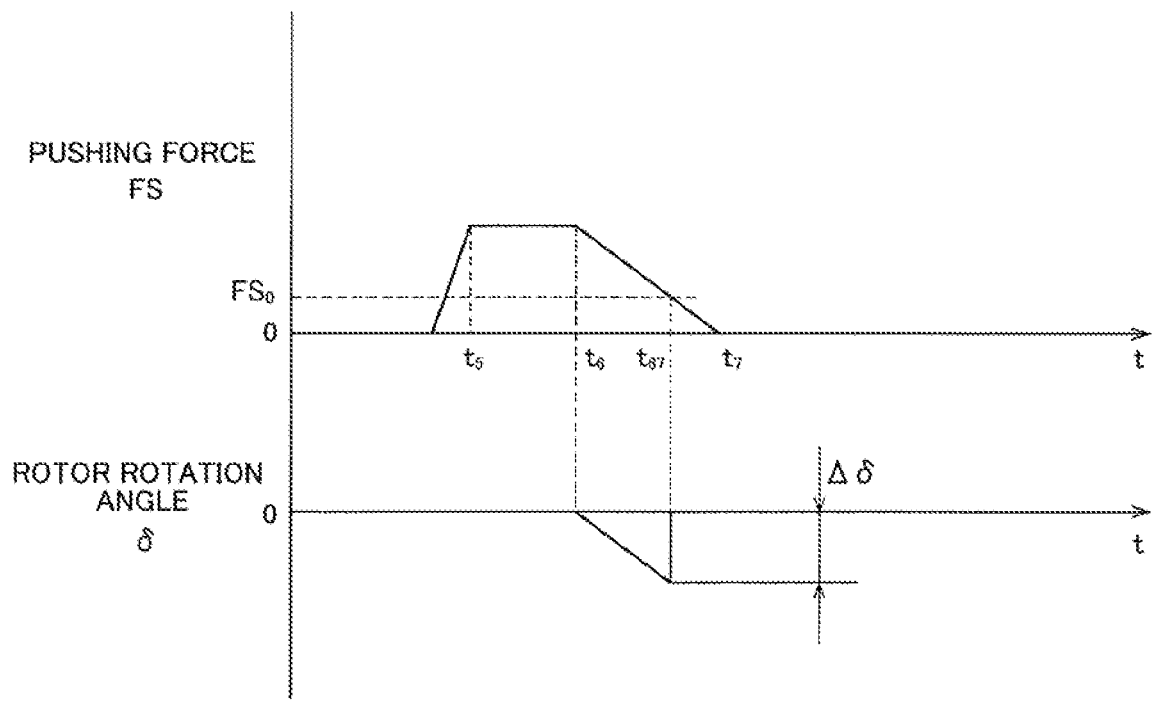

Further, it is anticipated that a situation in which an unintended braking force is generated will occur due to external factors such as inclination of the disc rotor 14 caused by a side force that acts on the wheel, thermal expansion caused by overheating of the electric brake device, and the like. This situation will be referred to as "external-factor-dependent situation". When such a situation occurs, it is anticipated that the clutch ON state will be established. To cancel the situation, the rotational shaft 48 needs to be rotated in the reverse rotational direction by the electric motor 44 with clutch ON state kept established. The rotation of the rotational shaft 48 in the reverse rotational direction, namely, a braking force cancelling operation, involves the rotation of the rotor 98 of the retracting torque applying mechanism 102 in the reverse rotational direction beyond the standby state. The braking force cancelling operation will be explained in detail referring to FIG. 8B. To cancel the pushing force FS generated at a time point $t_5$ by generation of the braking force, the rotational shaft 48 is rotated in the reverse rotational direction during a time period from a time point $t_6$ to a time point $t_7$. In this instance, the rotor 98 is rotated in the reverse rotational direction by the reverse rotational amount Δδ beyond the standby state in a time period from the time point $t_6$ to a time point $t_{67}$ at which the pushing force FS becomes equal to the set pushing force $FS_0$. The braking force cancelling operation can be also performed easily utilizing the configuration in which the displacement of the one end portion 100*a* of the torsion coil spring 100 in the reverse rotational direction is allowed by the first retaining portion 122.

What is claimed is:

1. An electric brake actuator configured to push a friction member onto a rotary body that rotates with a wheel, comprising:
   a main body;
   a piston held by the main body so as to be advanceable and retractable, the piston being configured to push the friction member toward the rotary body by advancing;
   an electric motor;
   a motion converting mechanism including a rotational shaft that receives a reaction force of a force by which the piston causes the friction member to be pushed onto the rotary body and that is rotated by the electric motor, the motion converting mechanism being configured to convert a rotational motion of the electric motor into an advancing and retracting movement of the piston; and
   a retracting torque applying mechanism including a torsion spring and configured to apply, to the rotational shaft, a retracting torque that is a torque in a direction in which the piston retracts, in dependence on an elastic torque generated by the torsion spring,
   wherein the retracting torque applying mechanism includes:
      a stator fixedly provided on the main body and including a first retaining portion retaining one end portion of the torsion spring;
      a rotor including a second retaining portion retaining the other end portion of the torsion spring, the rotor being configured to be rotated relative to the stator so as to twist the torsion spring; and
      a clutch mechanism configured such that, in a state in which the rotational shaft receives the reaction force, the rotational shaft and the rotor are in contact with each other by the reaction force so as to rotate together as a unit and such that, in a state in which the rotational shaft does not receive the reaction force, the rotational shaft and the rotor are spaced apart from each other for allowing relative rotation of the rotational shaft and the rotor,
   wherein a rotational direction that is the same as a rotational direction of the rotational shaft when the piston advances is defined as a forward rotational direction in the actuator, and a rotational direction that is the same as a rotational direction of the rotational shaft when the piston retracts is defined as a reverse rotational direction in the actuator, and
   wherein the first retaining portion prohibits the one end portion of the torsion spring from being displaced in the forward rotational direction and includes a biasing member that biases the one end portion of the torsion spring in the forward rotational direction, the first retaining portion being configured to allow the one end portion of the torsion spring to be displaced in the reverse rotational direction against a biasing force of the biasing member.

2. The electric brake actuator according to claim 1, wherein the first retaining portion is configured to allow the one end portion of the torsion spring to be displaced in the reverse rotational direction by not less than 10°.

3. The electric brake actuator according to claim 1, wherein the retracting torque applying mechanism includes a lower limit torque ensuring mechanism configured to prohibit the elastic torque of the torsion spring from becoming less than a set lower limit torque even in the state in which the rotational shaft does not receive the reaction force.

4. The electric brake actuator according to claim 3, wherein the lower limit torque ensuring mechanism is configured such that the one end portion of the torsion spring prohibits rotation of the rotor in the reverse rotational direction in a state in which the torsion spring is generating the set lower limit torque.

* * * * *